3,022,152
METHOD OF KILLING PLANTS
Charles W. Osborn and Roger F. Kleinschmidt, Bartlesville, Okla., assignors to Phillips Petroleum Company, a corporation of Delaware
No Drawing. Filed Oct. 15, 1957, Ser. No. 690,222
4 Claims. (Cl. 71—2.7)

This invention relates to a herbicidal composition and method. In one of its aspects, it relates to the killing of plants, employing, in suitable manner, at least one compound selected from the group consisting of trans-1,4-dibromo-2-butene and 1,4-dibromo-2-butyne. In another of its aspects, the invention relates to a composition for killing of plants, especially weeds, the composition comprising a herbicidal amount of at least one of the aforesaid compounds dispersed in a suitable herbicide adjuvant or carrier. In a more specific aspect of the invention, it relates to applying to plant foliage, to control the growth of the same, a herbicidal composition containing at least one of the aforesaid compounds dispersed in a suitable herbicide adjuvant permitting effective and ready application of the said compound to the plant foliage.

The use of chemicals to control the growth of plant foliage is well known in the art. Various chemicals have been used to control weeds in fields of agricultural crops, while others have been employed to selectively kill certain species of grasses which are growing on the same plot with other grasses. The use of herbicides has become widespread in certain industries, as for example, the killing of weeds around oil storage tanks where such plants would represent a fire hazard. Many commercial uses of herbicides of this nature are in practice at the present time. There is being made in the art, at this time constantly, a very large and serious effort to develop more effective and economical herbicides.

It is an object of this invention to provide a novel herbicidal composition. It is another object of this invention to provide a novel method of killing plant foliage, especially weeds. It is a further object of this invention to provide a method for killing weeds which are found in places where their presence is undesirable. It is a further object of this invention to provide an ingredient for a herbicidal composition and/or method which is readily produced economically and which is possessed of improved properties.

Other aspects, objects and the several advantages of this invention are apparent from a study of this disclosure and the appended claims.

According to the invention, there is provided a novel herbicidal composition and method which comprises using at least one of trans-1,4-dibromo-2-butene and 1,4-dibromo-2-butyne.

The method of the present invention whereby plant foliage is killed is carried out by applying a solution of the halogen-substituted butene and/or butyne to the plant or plants which are to be killed. Some examples of suitable solvents which can be employed are diesel fuel, kerosene, Stoddard solvent, benzene, toluene, ethyl alcohol, and the like. Hydrocarbon solvents are preferred, and the most preferred solvent is HF heavy alkylate, an isoparaffinic hydrocarbon having an approximate boiling range of 260 to 800° F., prepared by the alkylation of isoparaffins with olefins by bringing these reactants together in the presence of hydrofluoric acid. This type of isoparaffinic hydrocarbon is available commercially under the trade name of Soltrol.

The concentrations of the solutions of the herbicides of this invention are not always critical, since very dilute and quite concentrated solutions can be employed. The amount of the active herbicidal material which is applied to plant foliage to kill the plant will vary depending upon the specific plant being treated, the solvent employed, and whether or not the butene and/or butyne compound is to be used. The herbicides of this invention are quite effective at rates as low as 3.5 pounds per acre, although when employing the herbicides of this invention to kill plants which are very susceptible to herbicides, millet for example, even smaller amounts can be employed. From a practical standpoint, herbicides usually are employed in solutions in concentrations of from 0.01 to 5 percent by weight of the halogenated butene and/or butyne.

The composition and method of this invention are applicable to destroying plants which can be monocotyledonous or dicotyledonous.

It will be noted that one of the compounds of the invention possesses a double bond and that the other has a triple bond. These compounds are not homologues or isomers of each other. Therefore, these compounds are grouped together simply because they are unsaturated bromine-containing compounds and, therefore, as such, can be grouped conveniently together. They are not, however, chemical equivalents. The are simply alternative compounds which will yield results desired by the invention.

Only the trans form or isomer of 1,4-dibromo-2-butene is used in this invention as an active herbicidal material. It is a white crystalline solid which melts at 54° C. The 1,4-dibromo-2-butyne is a solid with a boiling point of 46 to 50° C. at 0.5–0.6 mm. Hg absolute pressure.

One great advantage of the herbicides of the present invention is that these materials will kill both monocotyledonous and dicotyledonous plants. The herbicides of this invention act rapidly to kill the plants, even at the very low dosages specified above.

It is preferred to use hydrocarbon solutions of the halogenated butene and butyne, since the effectiveness of the herbicides of this invention is definitely enhanced by these solvents. For example, it has been found that the use of the isoparaffinic hydrocarbons, mentioned and known as Soltrols, as solvents for the active herbicidal materials provides a killing action which requires much lower concentrations of the herbicides of this invention than solutions of these materials in such solvents as ethyl alcohol.

The following specific examples illustrate the effectiveness of the herbicides of this invention.

EXAMPLE I

A number of compounds was tested for herbicidal activity by the oat seedling test, a test which is based on the inhibition of vegetative growth of oat seedlings after soil treatment by the compounds to be tested. In this test, 18 oat seeds were planted in a 4-inch clay flower pot, and when the seedlings were about 4 inches high (usually seven days after planting), the plants are watered with 50 ml. of a solution containing 5 mg. of the test chemical. Seven days after treatment, the plants are cut at ground level, and the weights of the green sprouts are determined. The percent inhibition of growth is calculated by simultaneously comparing the weights of the treated plants to a control run in which the plant had been watered with distilled water. Five replications were made for each test. The results of these runs are expressed below as Table I.

Table I

| Compound Tested | Percent Inhibition |
|---|---|
| 1,4-dibromo-2-butene | 158.02. |
| 1,2-dibromo-1-propene | No measurable effect. |
| 1,3-dichloro-1-propene | Do. |
| 1,4-dicloro-2-butene | Do. |
| 2,3-dibromo-2-butene | Do. |

EXAMPLE II

Two compounds, 1,4-dibromo-2-butene and 1,4-dibromo-2-butyne, were tested for herbicidal activity by spraying solutions of these compounds onto the foliage of growing plants. These solutions were sprayed onto the foliage of both monocotyledonous and dicotyledonous plants.

The monocotyledonous plants, oats, wild oats, rye and maize, were planted in 4-inch clay flower pots, and after these plants were approximately one week to ten days old, the solutions of the herbicides were applied to the plants by spraying. The dicotyledonous plants, cucumbers, beans, peas, morning glories and radishes, were planted in 6-inch clay flower pots, and, they too, were approximately one week to ten days old when sprayed.

The 1,4-dibromo-2-butene employed in these tests was the pure trans isomer, a compound which melts at 54° C.

In these tests, amounts of the active herbicidal materials were sprayed onto the plants in either 5, 10 or 20 cc. volumes. The results of these tests are expressed below as Table II.

one day. Kerosene alone did not affect the plants to any large degree. Diesel fuel when used alone, showed some herbicidal activity toward monocotyledonous plants. A solution of 5 mg. of 1,4-dibromo-2-butyne in diesel fuel gave total kill of the plants in one day. While the diesel fuel alone was an effective herbicide, it was apparent that the solution of 1,4-dibromo-2-butyne in diesel fuel was more effective as a herbicide than the hydrocarbon alone.

Reasonable variation and modification are possible within the scope of the foregoing disclosure and the appended claims to the invention, the essence of which is that trans-1,4-dibromo-2-butene and 1,4-dibromo-2-butyne have been found preeminently suited to the control of plant foliage by killing the same.

We claim:

1. A method of controlling growth of plant foliage by applying to the same, in a quantity effective to substantially kill the plant, at least one compound selected from the group consisting of trans 1,4-dibromo-2-butene and 1,4-dibromo-2-butyne.

2. A method according to claim 1 wherein application to the plant is made at a rate at least in excess of approximately 3.5 pounds of the compound per acre.

3. A method of controlling growth of plant foliage by applying to the same, in a quantity effective to substantially kill the plant, trans 1,4-dibromo-2-butene.

4. A method of controlling growth of plant foliage by applying to the same, in a quantity effective to substantially kill the plant, 1,4-dibromo-2-butyne.

Table II

| Compound Tested | Solvent Employed | Milligrams of Active Herbicide Employed | Vol. of Solution Sprayed onto Plants ccs. | Type of Plant | Effect on Plant |
|---|---|---|---|---|---|
| 1,4-dibromo-2-butyne | Ethyl Alcohol | 12.5 | 10 | Monocotyledonous | Complete kill in 24-48 hours. |
| Do | do | 6.25 | 10 | do | Some of the Plants still alive at 24-48 hours. |
| Do | do | 3.125 | 10 | do | Most of the Plants were alive at 24-48 hours. |
| Do | Soltrol | 3.125 | 5 | do | Complete kill at 24-48 hours. |
| Do | Ethyl Alcohol | 100 | 20 | Dicotyledonous | All Plants killed in 24-48 hours but peas. |
| Do | do | 50 | 20 | do | Most of radishes and cucumbers killed and some morning glories killed at 24-48 hours. |
| Do | Soltrol | 25 | 10 | do | Total killed at 24-48 hours. |
| 1,4-dibromo-2-butene | Ethyl Alcohol | 50 | 10 | Monocotyledonous | Do. |
| Do | do | 25 | 10 | do | Almost total killed at 24-48 hours. |
| Do | Soltrol | 25 | 5 | do | Total killed at 24-48 hours. |
| Do | do | 12.5 | 5 | do | Almost total killed at 24-48 hours. |

The Soltrol and ethyl alcohol did not affect the plants when each were applied alone.

EXAMPLE III

The test procedure of Example II was employed to determine the herbicidal activity of 1,4-dibromo-2-butyne in solution in either diesel fuel or kerosene. In this test, these solutions were sprayed on monocotyledonous plants as described in Example II, using 5 cc. of solution per 4-inch clay flower pot. The monocotyledonous plants which were sprayed were oats, wild oats, rye and maize, said plants being approximately one week to ten days old when sprayed. A solution containing 5 mg. of 1,4-dibromo-2-butyne in kerosene gave total kill of the plants in References Cited in the file of this patent

UNITED STATES PATENTS

| 2,586,793 | Doty et al. | Feb. 26, 1952 |
| 2,704,246 | Goodhue et al. | Mar. 15, 1955 |
| 2,749,377 | Johnston | June 5, 1956 |
| 2,773,331 | Hughes | Dec. 11, 1956 |
| 2,794,727 | Barrons | June 4, 1957 |
| 2,836,536 | Meuli | May 27, 1958 |

FOREIGN PATENTS

| 590,368 | Great Britain | July 16, 1947 |

OTHER REFERENCES

Ahlgren et al.: "Principles of Weed Control," 1951, pages 69–71.